United States Patent

[11] 3,562,468

| [72] | Inventor | Joseph P. Stefani |
| | | Warwick, R.I. |
| [21] | Appl. No. | 771,732 |
| [22] | Filed | Oct. 30, 1968 |
| [45] | Patented | Feb. 9, 1971 |
| [73] | Assignee | General Electric Company |
| | | a corporation of New York |

[54] SWITCH MOUNTING MEANS
1 Claim, 5 Drawing Figs.

| [52] | U.S. Cl. | 200/168, 174/53 |
| [51] | Int. Cl. | H02b 1/10 |
| [50] | Field of Search | 174/53; 200/168B |

[56] References Cited

UNITED STATES PATENTS

| 1,992,059 | 2/1935 | Despard | 174/53 |
| 2,248,201 | 7/1941 | Russell et al. | 174/53 |
| 2,506,212 | 5/1950 | Grohsgal | 174/53 |
| 2,854,501 | 9/1958 | Ludwig | 174/53 |
| 2,969,418 | 1/1961 | Benander | 174/53 |
| 3,335,248 | 8/1967 | Bassani | 174/53(X) |

*Primary Examiner*—H. O. Jones
*Attorneys*—Paul E. Rochford, Frank L. Neuhauser, Oscar B. Waddell and Melvin M. Goldenberg

ABSTRACT: Means for mounting a wiring device in a supporting bracket is provided. More specifically, a mounting strap is formed with end portions which can be easily bent with a screwdriver or similar tool to engage receiving openings formed in a mounting bracket to securely mount the wiring device to the bracket.

PATENTED FEB 9 1971

3,562,468

Inventor:
Joseph P. Stefani by Paul E. Rochford
Attorney

Inventor:
Joseph P. Stefani by Paul E. Rockford
Attorney

SWITCH MOUNTING MEANS

The present invention relates to the mounting of wiring devices and to means by which this is accomplished. More specifically, the present invention teaches means for mounting wiring devices securely on a supporting bracket through use of fasteners formed integrally with the strap of the wiring devices.

In the use of wiring devices particularly those which are mounted on brackets in wall fixtures, there is a need for economy of construction that is economy of components of the wiring device itself, and also an economy in the time which must be employed in mounting the device to its supporting structure. Further, it is desirable that the mounting can be effected through the use of relatively simple tools and without the need for handling of relatively small parts such as screws or clips of the like. Where feasible the use of mounting screws is to be avoided not only because of the cost of the screws and of screw receptacles into which they must be threaded but also because of the time consumed in aligning the parts and in effecting the threading of the screw into place. Further, as the size of the devices themselves is reduced, it is not always feasible to employ screw mounting means because of space limitations as well as because of cost in terms of parts and time referred to above.

The considerations referred to above are particularly pertinent to the mounting of a gang of low voltage wiring devices such as low voltage switches or indicator lights because of the small space in which these devices must be mounted in certain applications to permit optimum use to be made of the devices and to permit the cost of their use to be kept at reasonable levels.

It is accordingly one object of the present invention to provide means for mounting wiring devices reliably and efficiently at low cost.

Another object of the present invention is to provide means for mounting low voltage switches in multigang brackets with minimum time and parts.

A further object of the present invention is to provide a bracket and low voltage switch combination which facilitates the wiring and mounting of low voltage switches with high efficiency.

Other objects and advantages of the present invention will be in part apparent and in part pointed out in the description which follows.

In one of its broader aspects, the object of the present invention may be carried out by providing a wiring device mounting means comprising a bracket having at least one opening therein adapted to receive said device, said device having a body portion adapted to fit through the opening and having a mounting strap with a length greater than the length of the bracket opening, the end of the mounting strap having side slots therein of a width to accommodate a bending tool and of a length less than half the width of the end of the mounting strap to facilitate bending of the corners of the strap to open the slots, and said bracket being provided with bridges proximate the ends of the straps to receive the corners bent out from said strap.

The advantages of the present invention and how it is carried into effect will be made clearer by reference to the accompanying description and the drawings in which.

Figures 1, 2, 3:
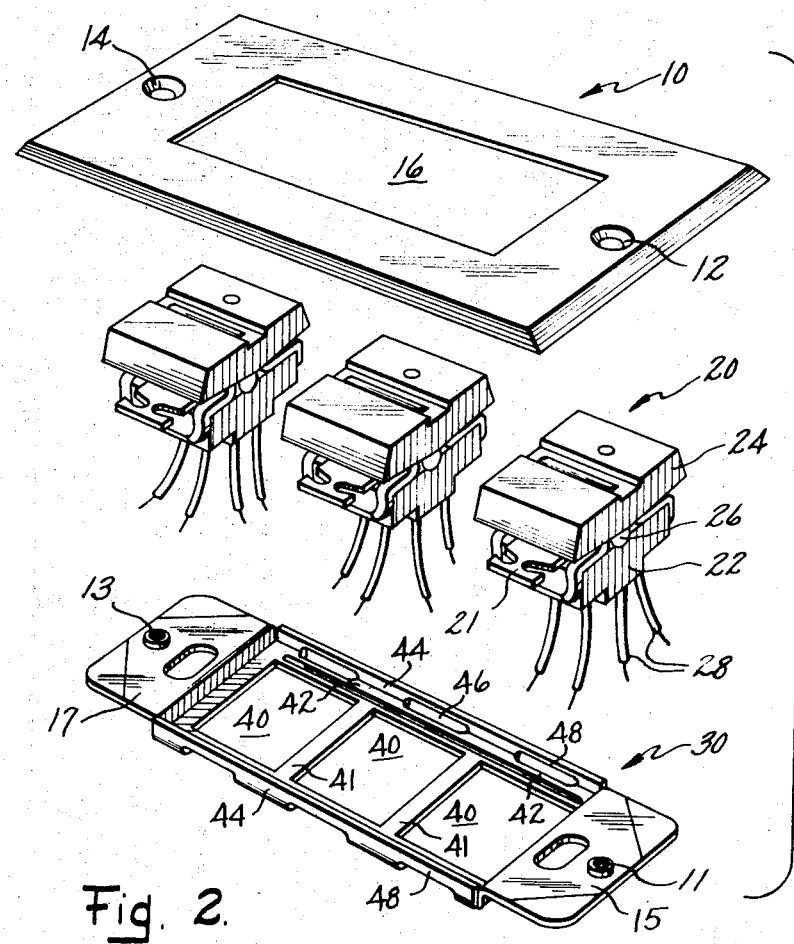
FIG. 1 is a perspective view of the switch structure exploded to illustrate the relation of the parts.
FIG. 2 is a top plan view of the switch prior to mounting in the bracket for assembly.
FIG. 3 is a side elevation of the mounting strap of the switch showing the profile of the bendable corners.

Referring first to FIG. 1, an exploded perspective view of a multiple gang switch adapted to be mounted in accordance with the present invention is shown. A cover plate 10 is shown superposed over a gang of switches 20 which are in turn superposed over a mounting bracket 30. The cover plate 10 is made of some conventional material such as phenolic or other insulating or conducting material and has two screw holes 12 and 14 for insertion of screws into the threaded holes 11 and 13 at the ends 15 and 17 respectively of the bracket 30. A center opening 16 in cover 10 accommodates the three switch rockers of the switch gang 20 in side by side relation with no transverse rib or separator between them.

The switches are shown in their position relative to both the cover 10 above and the bracket 30 below into which they are mounted. When mounted in the cover, their rockers 24 are positioned more closely together than in the position shown in the exploded view of FIG. 1.

Details of the switch strap structure 27 are given in FIGS. 2 and 3. Referring again first to FIG. 1, it is seen that the typical structure of the switch itself includes the base 22 and a rocker 24 operating about the trunnion 26. Pressing the rocker in the place labeled ON activates an element controlled by the switch and pressing it in the end labeled OFF deactivates a switch controlled element. Wires 28 carry the control current to an element, such as the relay, to be controlled. With reference to FIG. 2, the form of the end section 21 of the strap, with the rocker 24 shown mounted on it, is seen. Each end section 21 has two lateral slots 25 one entering from either side. Although laterally disposed, the slots need not be normal to the longitudinal axis of the strap and are preferably pitched at an angle so that the corner piece 23 defined between the slot 25 and the corner edges of the end section is somewhat triangular in shape and has its narrowest section 29 near the end of the strap. The narrowing of the section 29 facilitates bending of the corner piece 23 while also providing a larger turning arc for the bending tool before the tool can abut against the side of the bridge as explained below.

Referring now to FIG. 3, the profile of the strap is seen with the other elements of the switch shown in phantom. The corner 23 of the strap is seen to be turned up at its trailing edge 23a so that as the slot 25 is enlarged under the urging of a tool such as a screwdriver, the corner 23 can engage the underside of a bridge 48 formed integrally with the bracket in which the switch is mounted.

Figure 4:
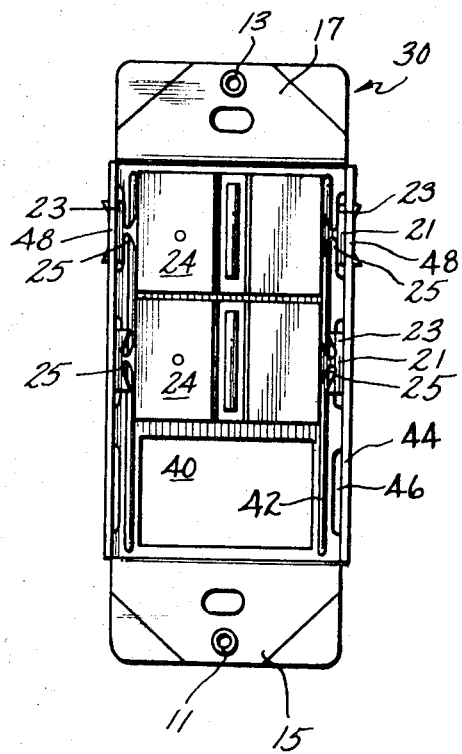
FIG. 4 is a top plan view of a bracket into which the switch is mounted.
Figure 5:
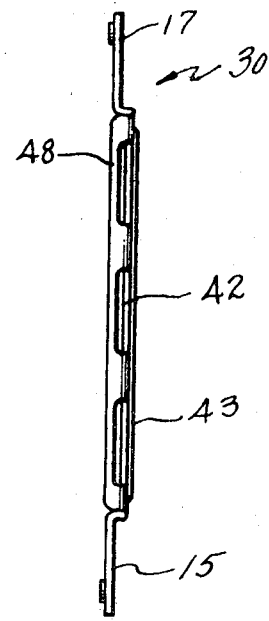
FIG. 5 is a side elevation of the bracket of FIG. 4 illustrating the side bridges.

Referring now to FIGS. 4 and 5, the bracket 30 in which the switch is mounted is shown in top plan and side elevational views. It will be seen that the body of the switch fits through an opening 40 and that the ends 21 of the strap 27 of the switch rest on the shelf 42 which extends along the side of the bracket. Laterally extending cross strips 41 also comprising integral portions of the strip of metal from which the bracket 30 was formed extend between the side shelves 42 of the bracket. The bracket has turned up longitudinal edge portions 44 and has formed in the side thereof slots 46, so that a section 48 of the turned up longitudinal edge portion 44 which remains forms a bridge proximate each device opening 40 of the bracket.

Referring again now to FIG. 4, the manner of interlocking the strap and 21 with the bracket is explained. As is evident there are positions or openings for three switches in bracket 30. No switch is shown in the lowest opening 40. A switch is shown as it would appear where dropped or mounted into place in the middle opening. In the strap end 21 of this switch, the slots 25 are shown in their "as formed" condition, that is, the slots have not been enlarged or pried open as by inserting a screwdriver blade into place and turning it to enlarge the open end of the slot.

However, the strap of the top switch is shown with the slots 25 opened up and the corners 23 turned to engage the undersurface of the bridges 48.

From FIG. 4 the simplicity, ease and rapidity of mounting of switches is evident as the complete mounting is accomplished by inserting the switch into an opening 40 and turning the corner pieces 23 under the bridges 48.

To strengthen the bracket a narrow trough 43 may be formed along the shelf 42 but this is not essential to accomplish the mounting of switches pursuant to this invention. Such a trough 43 is shown in the profile view of FIG. 5.

I claim:

1. Wiring device mounting means which comprises:

a bracket having a front and back surface and plurality of openings therein adapted to receive wiring devices;

each of said devices having a body portion extending through one of said openings and having a mounting strap abutting the front surface of said bracket;

the ends of said straps disposed adjacent the longitudinal edges of said bracket;

the longitudinal edges of said bracket being bent forward and having openings formed in the bent forward portion aligned with the ends of said straps; and said straps having corners turned out from side slots at said corners extending into and engage the openings of said bent forward portion of said bracket.